(12) United States Patent
Tsukamoto

(10) Patent No.: US 7,519,377 B2
(45) Date of Patent: Apr. 14, 2009

(54) CALLING SYSTEM FROM ACCESSORY TO PORTABLE DEVICE

(75) Inventor: Tadashi Tsukamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1595 days.

(21) Appl. No.: 09/974,374

(22) Filed: Oct. 10, 2001

(65) Prior Publication Data
US 2002/0042281 A1 Apr. 11, 2002

(30) Foreign Application Priority Data
Oct. 10, 2000 (JP) ............................. 2000-309382

(51) Int. Cl.
*H04M 3/42* (2006.01)

(52) U.S. Cl. ...................... 455/462; 455/567

(58) Field of Classification Search ................. 455/567, 455/569.1, 462, 556.1, 550.1, 552.1; 379/373.01; 340/7.1, 7.58, 539, 531, 825.49, 825.36, 340/825.54, 407.1, 691.6, 692, 693.5, 686.6
See application file for complete search history.

(56) References Cited

U.S. PATENT DOCUMENTS

| | | | | |
|---|---|---|---|---|
| 4,969,181 A | * | 11/1990 | Ito ........................... | 455/569.1 |
| 5,040,204 A | * | 8/1991 | Sasaki et al. ............. | 455/552.1 |
| 5,117,449 A | * | 5/1992 | Metroka et al. .......... | 455/552.1 |
| 5,638,050 A | * | 6/1997 | Sacca et al. ................ | 340/571 |
| 6,028,513 A | * | 2/2000 | Addy ..................... | 340/539.16 |
| 6,215,405 B1 | * | 4/2001 | Handley et al. ............. | 340/584 |
| 6,269,257 B1 | * | 7/2001 | Cannon et al. .............. | 455/567 |
| 6,292,674 B1 | * | 9/2001 | Davis ....................... | 455/550.1 |
| 6,330,438 B1 | * | 12/2001 | McClelland et al. ........ | 455/421 |
| 6,377,818 B2 | * | 4/2002 | Irube et al. ............... | 455/556.1 |
| 6,532,374 B1 | * | 3/2003 | Chennakeshu et al. ... | 455/569.1 |
| 2001/0023182 A1 | * | 9/2001 | Bach et al. .................. | 455/414 |
| 2002/0034970 A1 | * | 3/2002 | Higuchi et al. .............. | 455/567 |

FOREIGN PATENT DOCUMENTS

| | | |
|---|---|---|
| JP | 10-262279 | 9/1998 |
| JP | 11-346389 | 12/1999 |
| JP | 2000-172650 | 6/2000 |
| JP | 2000-276247 | 10/2000 |
| JP | 2000-278404 | 10/2000 |
| JP | 2002-536898 | 10/2002 |

* cited by examiner

*Primary Examiner*—Sam Bhattacharya
(74) *Attorney, Agent, or Firm*—Scully, Scott, Murphy & Presser, P.C.

(57) ABSTRACT

A radio communication method allowing a portable device to be easily found using its accessory is disclosed. In response to an operation of a predetermined key of the accessory, the accessory transmits a ringing signal to the portable device. When receiving the ringing signal from the accessory, the portable device starts alerting and, when a predetermined key of the portable device is operated, the portable device stops alerting.

19 Claims, 7 Drawing Sheets

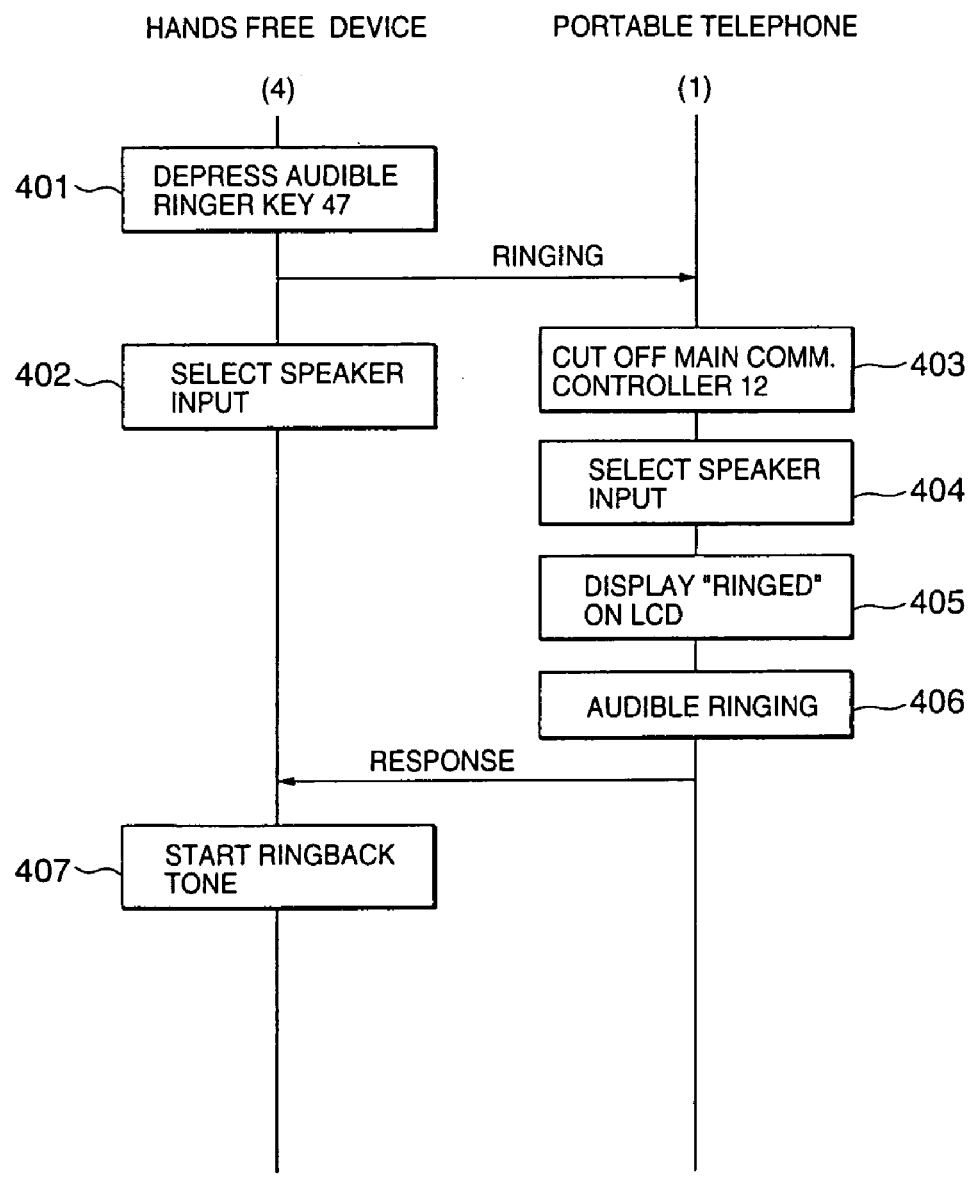

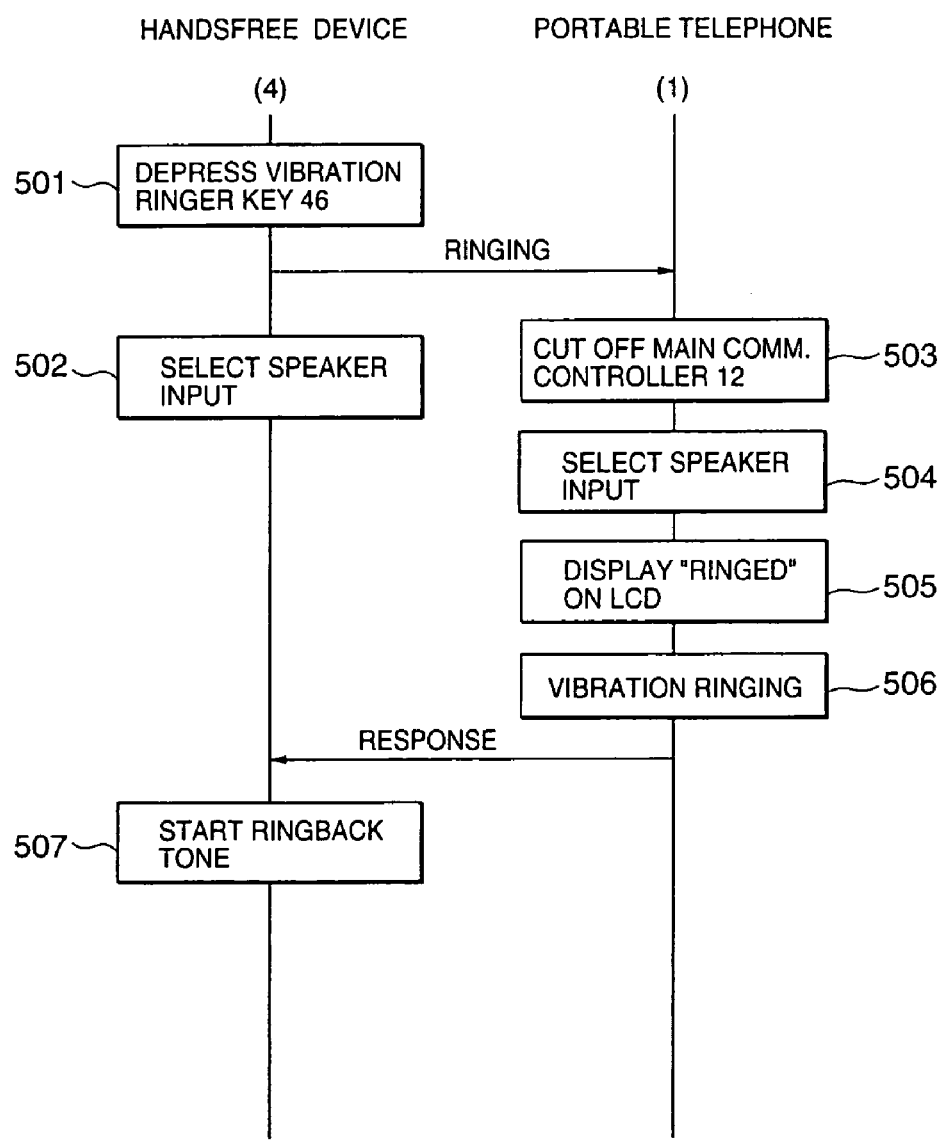

CALLING SYSTEM FROM ACCESSORY TO PORTABLE DEVICE

BACKGROUND OF THE INVENTION

1. Field of the Invention

The present invention relates to a radio communication system composed of a portable device such as a portable telephone or a portable information terminal and its radio accessory such as a radio hands-free device, and in particular to a radio communication system and method between them.

2. Description of the Related Art

There has been commercially available a radio hands-free device provided for a cellular phone, allowing hands-free telephone conversation.

On the other hand, there has been standardized short-range radio communication such as Bluetooth™ that is an open standard for short-range transmission of digital voice and data between mobile devices and desktop devices. Such a short-range radio interface is expected to connect a cellular phone to a peripheral device and various accessories or peripheral devices allowing connection to the cellular phone by the short-range radio interface are researched and developed. As such an accessory or peripheral device, a hands-free device, a wristwatch-sized keypad device or the like can be considered.

In addition, such an accessory is allowed to control the cellular phone without directly operating it. Since the accessory is smaller and lighter than the cellular phone, the user can use it to operate the cellular phone that is taken in his/her bag or the like as a so-called base station.

SUMMARY OF THE INVENTION

The radio accessory or peripheral device as described above is not connected to the portable device by a visible cord but invisible radio. Accordingly, the inventor has found that there are cases where the user has only the accessory therewith and whereabouts of the portable device becomes unknown.

An object of the present invention is to provide a radio communication system and method allowing the portable device to be easily found.

According to the present invention, a communication method between a portable device and its accessory using a radio channel, includes the steps of: in response to an operation of a predetermined key of the accessory, the accessory transmitting a ringing signal to the portable device; when receiving the ringing signal from the accessory, the portable device starting alerting; and in response to an operation of a predetermined key of the portable device, the portable device stopping alerting.

The portable device may be previously set to one of audible ringing mode and silent ringing mode, wherein the portable device starts alerting according to a preset ringing mode.

Alternatively, the ringing signal may designate one of audible ringing mode and silent ringing mode, wherein the portable device starts alerting according to a designated ringing mode.

According to an embodiment of the present invention, the portable device is previously set to at least one ringing mode of audible ringing mode, vibration ringing mode, a light-emitting ringing mode, and a display ringing mode, wherein the portable device starts alerting according to said at least one ringing mode.

According to another embodiment of the present invention, the ringing signal designates one of audible ringing mode, vibration ringing mode, a light-emitting ringing made, wherein the portable device starts alerting according to a designated ringing mode.

The radio channel may be established in response to the operation of the predetermined key of the accessory before the accessory transmits the ringing signal to the portable device. The radio channel may include a control channel and a data channel, wherein the ringing signal is transmitted at the control channel. The portable device may be a portable telephone operable in a mobile communications network and the accessory may be a hands-free device for the portable telephone. When the portable telephone actively connected to the hands-free device is operating on communication with the mobile communications network, a reception voice signal which the portable telephone receives from the mobile communications network is transmitted to the hands-free device and a transmission voice signal which the hands-free device inputs is transmitted to the portable telephone.

As described above, when a user has only the accessory therewith and whereabouts of the portable device becomes unknown, the user operates a ringing key of the accessory and thereby the ringing signal is transmitted to the portable device. This causes the portable device to notify the user, by audible ringing, vibration, and/or LED blinking, of its whereabouts. Accordingly, the user can easily find the portable device. In addition, a combination of audible ringer, vibration ringer and LED ringer can be previously set by the user. Accordingly, an appropriate ringing mode can be selected as circumstances demand.

In the case where a desired ringing mode can be designated by the user operating the accessory, a desired one of audible ringer and silent ringer (vibration and/or LED blinking) can be activated when looking for the portable device. Therefore, an appropriate ringer can be used as circumstances demand.

BRIEF DESCRIPTION OF THE DRAWINGS

FIG. 7 is a diagram showing a sequence for calling the portable telephone from the hands-free device according to a second embodiment when an audible ringer key has been depressed; and FIG. 8 is a diagram showing a sequence for calling the portable telephone from the hands-free device according to the second embodiment when a vibration ringer key has been depressed.

DESCRIPTION OF THE PREFERRED EMBODIMENTS

A first embodiment of the present invention will be described hereafter, taking as an example a combination of a radio portable telephone 1 and a hands-free device 3 that is an accessory capable of being connected to the portable telephone by radio. In this embodiment, a short-range radio communication interface is adopted to allow mutual communication between them.

Figure 1:
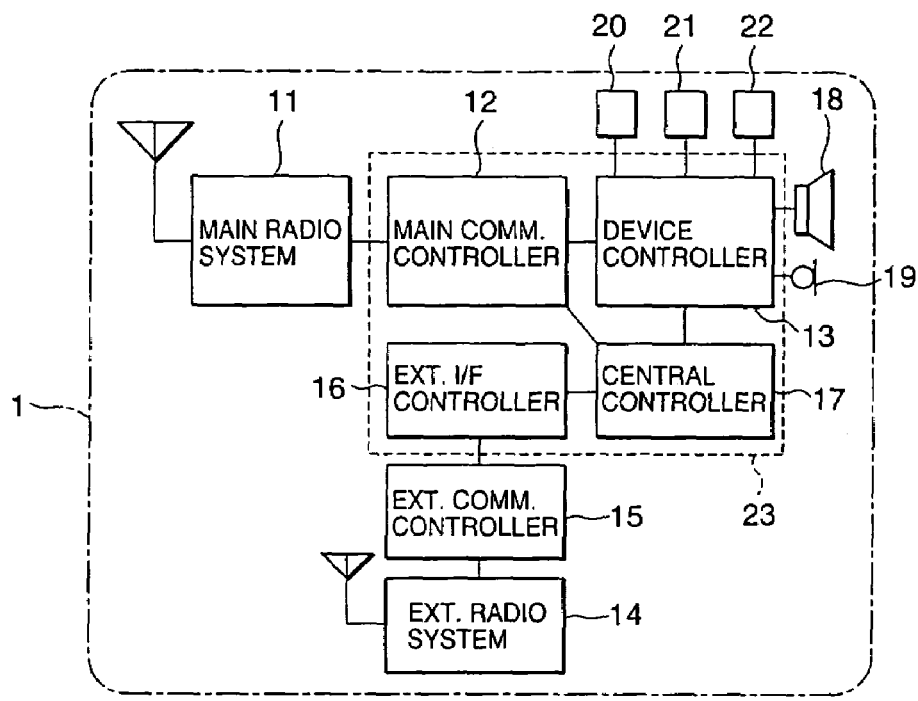
FIG. 1 is a block diagram showing a portable telephone of a radio communication system according to a first embodiment of the present invention.

Referring to FIG. 1, the portable telephone 1 is provided with a main radio system 11 which allows mutual communication with a radio base station of a mobile communications network (not shown). The main radio system 11 is connected to a main communication controller 12, which performs call setup by exchanging control signals with the mobile communications network and voice or data communication with the other end party at an established channel.

A device controller 13 is connected to a microphone 19, a speaker 18, a vibrator 20, a liquid-crystal display (LCD) device 21, a light-emitting diode (LED) 22, and other necessary devices including a keypad (not shown). The device controller 13 converts a voice signal from analog to digital and vice versa. Further, the device controller 13 controls the speaker 18, the vibrator 20, the LCD device 21 and the LED 22 such that at least one of them is activated to notify a user in a preset mode, for example, when calling or called.

An external interface controller 16 provides an interface to an external communication controller 15 that controls an external radio system 14. The external radio system 14 is used to communicate with the hands-free device 3 through a radio channel.

A central controller 17 controls the operations of the main communication controller 12, the device controller 13 and the external interface controller 16. The central controller 17 may be a central processing unit (CPU). Alternatively, functions of respective ones of the main communication controller 12, the device controller 13, the external interface controller 16 and the central controller 17 may be implemented by a CPU on which corresponding control programs are running.

In the case where the hands-free device 3 is connected to the portable telephone 1, the central controller 14 automatically or manually instructs the device controller 13 to stop operations of the speaker 18 and the microphone 19. When the portable telephone 1 is called from the hands-free device 3, a preset combination of the speaker 18, the vibrator 20, the LCD device 21 and the LED 22 is activated to attract the attention of the user.

Figure 2:
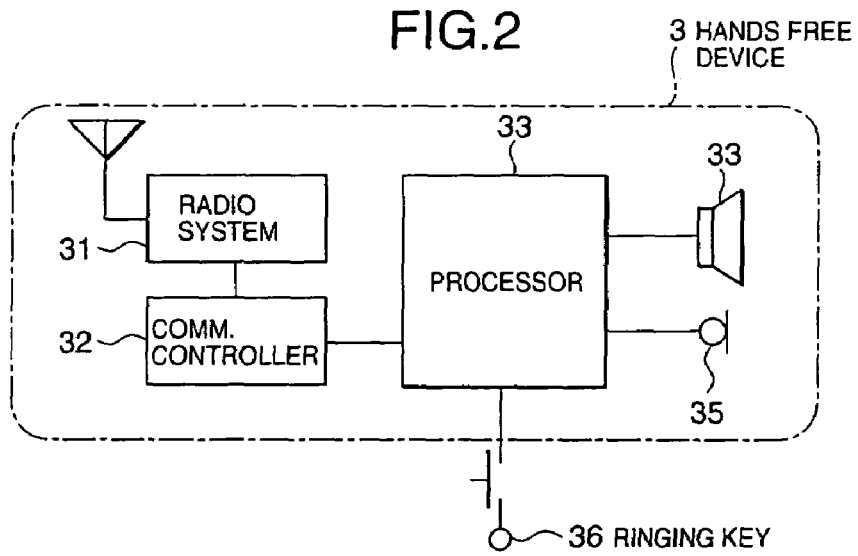
FIG. 2 is a block diagram showing a hands-free device of the radio communication system according to the first embodiment of the present invention.

Referring to FIG. 2, the hands-free device 3 is provided with a radio system 31, a communication controller 32, a processor 33, an earphone speaker 34, a microphone 35, and a ringing key 36.

The radio system 31 is used to communicate with the portable telephone 1 through the radio channel. The communication controller 32 is used to set up the channel to the portable telephone 1.

The processor 33 is connected to the earphone speaker 34 and the microphone 35, and a ringing key 36. The processor 33 converts a voice signal from analog to digital and vice versa, allowing telephone conversation via the radio channel to the portable telephone 1. When the ringing key 36 is depressed, the processor 33 instructs the communication controller 32 to transmit a ringing signal to the portable telephone 1, which will be described in detail later.

Here, the ringing key 36 is provided as a piece of hardware in the hands-free device 3. Alternatively, the ringing key 36 may be implemented with software such that a button for ringing is displayed as one of menu choices on the screen of an LCD device.

The radio interface is not limited to one-to-one communication. When time division multiplexing or code division multiplexing scheme is adopted as the radio interface, a plurality of communication channels may be obtained. A control signal is transmitted through a control channel and a voice signal is transmitted through a data channel.

A calling operation after a communication channel has been established will be described with reference to FIG. 3.

Figure 3:
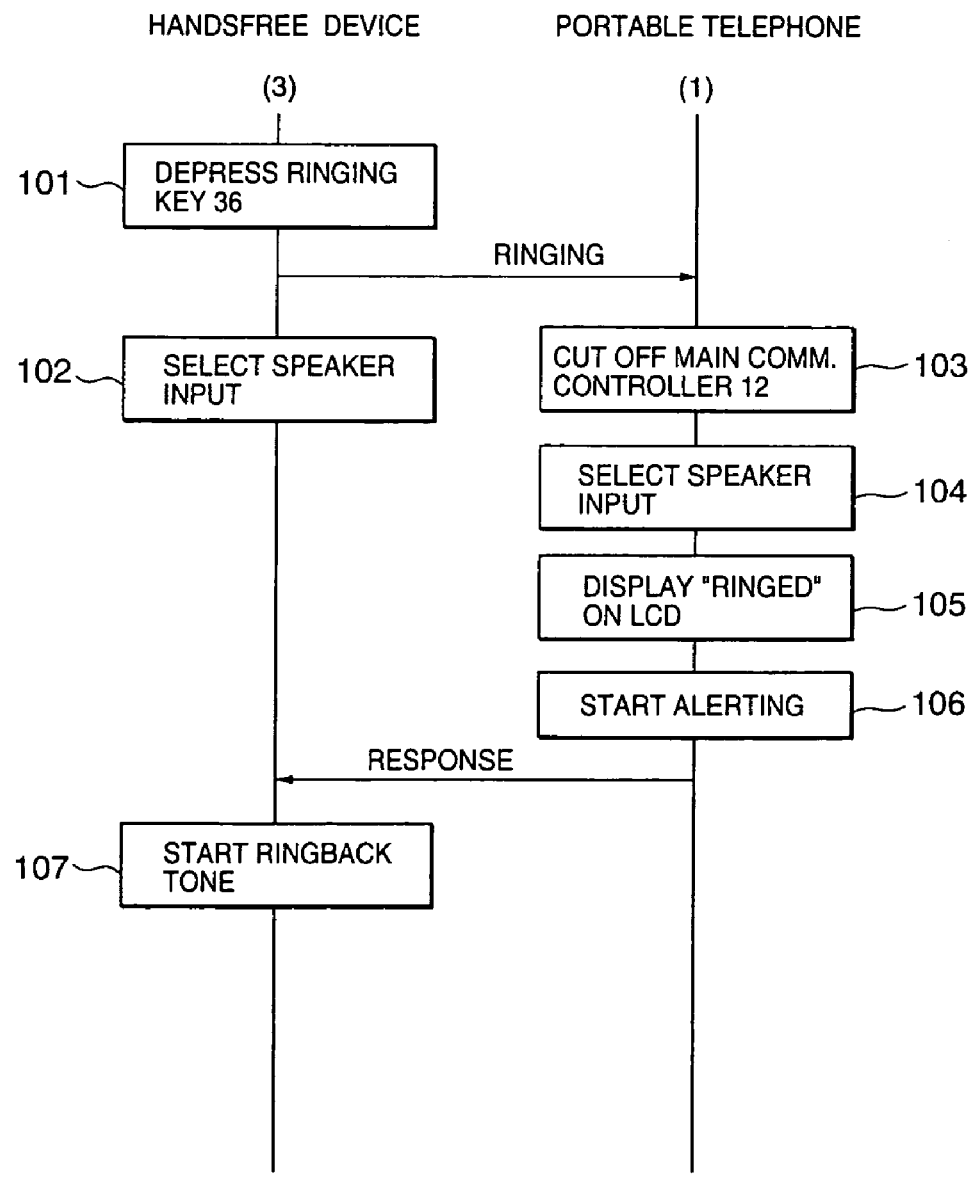
FIG. 3 is a diagram showing a sequence for calling the mobile telephone from the hands-free device after a connection between them has been established.

Referring to FIG. 3, when a user depresses the ringing key 36 of the hands-free device 3 to call the portable telephone 1 (step 101), the processor 33 of the hands-free device 3 instructs the communication controller 32 to transmit a ringing signal to the portable telephone 1 at the control channel. The ringing signal is a control signal for instructing audible or vibration ringer of the portable telephone 1 to notify the user where the portable telephone 1 is located. In the hands-free device 3, the processor 33 selects input signals of the speaker 34 so as to output various tones generated therein to the speaker 34 (step 102).

When the ringing signal has been received from the hands-free device 3, the central controller 17 of the portable telephone 1 cuts off the signal path of the main communication controller 12 to prohibit incoming calls from the mobile communications network (step 103). For example, the signal path of the main communication controller 12 is cut off by powering off the main radio system 11, making the signal line open between the main radio system 11 and the main communication controller 12, or discarding a paging signal received from the mobile communications network.

Subsequently, the central controller 17 instructs the device controller 13 to select input signals of the speaker 18 in response to the ringing signal received from the hands-free device 3 (step 104). Further, the central controller 17 instructs the device controller 13 to display a message indicating that this telephone is ringed on the LCD device 21 (step 105). Thereafter, the central controller 17 instructs the device controller 13 to start alerting with a preset combination of the speaker 18, the vibrator 20, the LCD device 21 and the LED 22 (step 106).

When having started alerting, the central controller 17 instructs the external communication controller 15 through the external interface controller 16 to transmit a response signal to the hands-free device 3. This response signal is a control signal for notifying the hands-free device 3 that the alerting operation starts.

When receiving the response signal from the portable telephone 1, the processor 33 starts a ring back tone to notify the user that the portable telephone 1 starts alerting (step 107). In the case where the hands-free device 3 is provided with a display device, a message indicating the portable telephone 1 starts alerting may be displayed on the display device.

When the user becomes aware of the portable telephone 1 audible or vibration ringing with displaying "ringed" on the LCD device 21, the user operates the portable telephone 1 to acknowledge. The acknowledging operation will be described with reference to FIG. 4.

Figure 4:
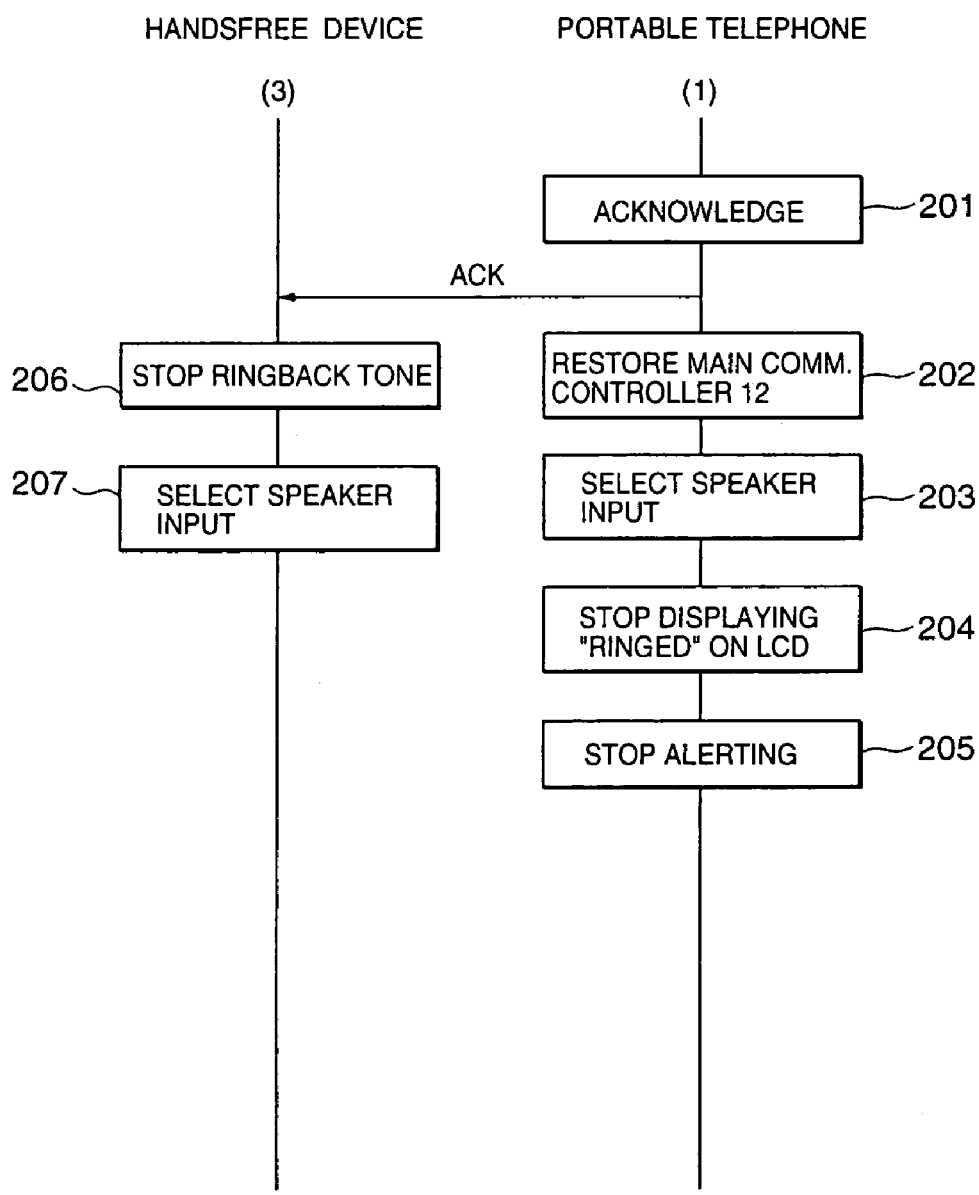
FIG. 4 is a diagram showing a sequence for acknowledging operation at the portable telephone after the mobile telephone has been ringed.

Referring to FIG. 4, when the user performs an acknowledging operation such as depressing an off-hook key or the like (step 201), the central controller 17 instructs the external communication controller 15 through the external interface controller 16 to transmit an acknowledgement signal to the hands-free device 3. The acknowledgement signal is a control signal for notifying the hands-free device 3 that the user has found the portable telephone 1.

After having transmitted the acknowledgement signal, the central controller 17 restores the signal path of the main communication controller 12 (step 202). In addition, the central controller 17 selects input signals of the speaker 18 so as to alert the user to an incoming call and directs received voice signals to the hands-free device 3 through the external radio system 14 (step 203). Further, the central controller 17 instructs the device controller 13 to stop the LCD device 21 displaying the message "ringed" (step 204) and then to stop alerting.

At the hands-free device 3, when receiving the acknowledgement signal from the portable telephone 1, the processor 33 stops a ring back tone (step 206) and selects input signals of the speaker 34 so as to output the voice signals received from the portable telephone 1 (step 207).

A calling operation in a state that a communication channel has never been established will be described with reference to FIG. 5.

Figure 5:
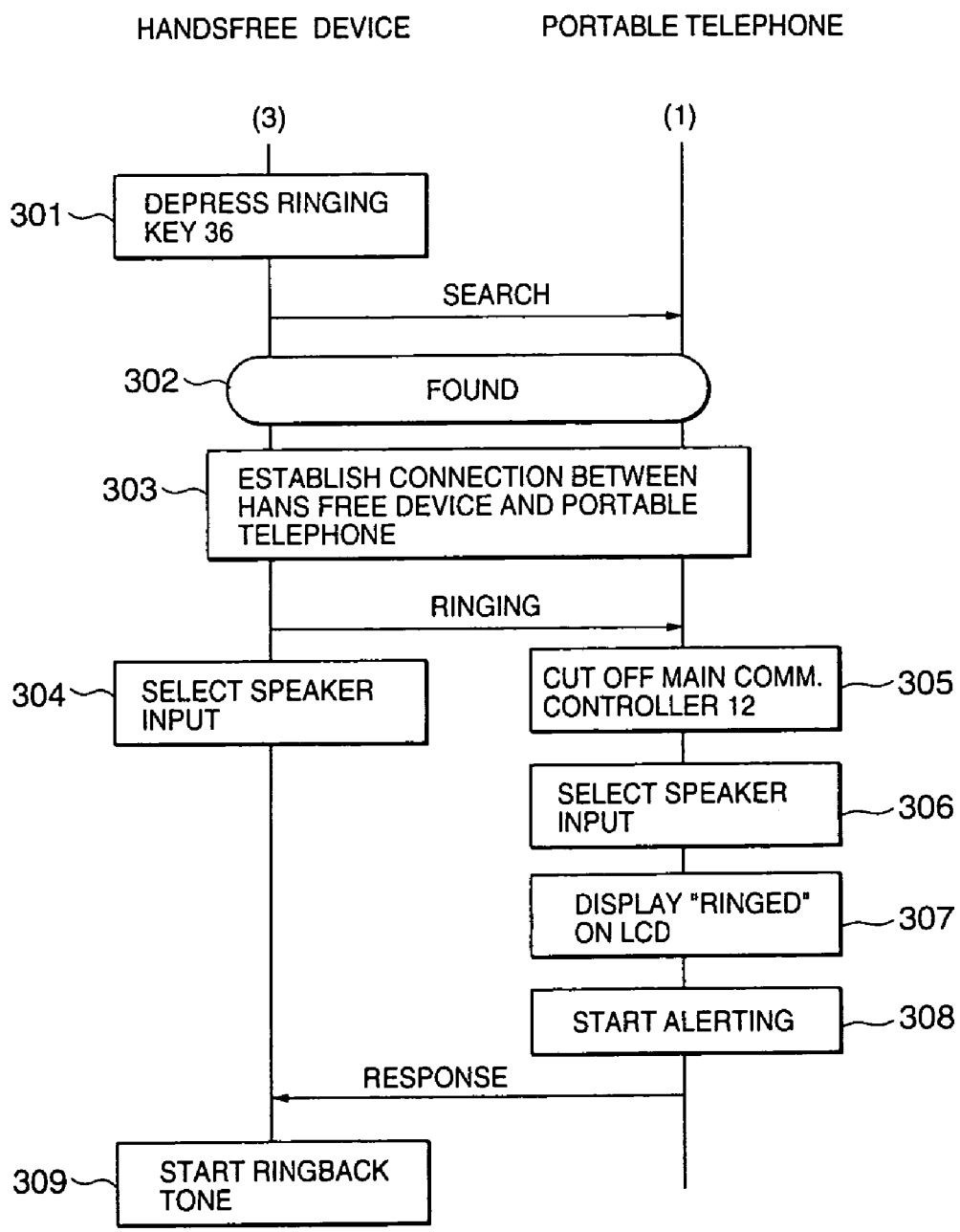
FIG. 5 is a diagram showing a sequence for calling the mobile telephone from the hands-free device in a state that a connection between them is not established.

Referring to FIG. 5, when a user depresses the ringing key 36 of the hands-free device 3 to call the portable telephone 1 (step 301), the processor 33 of the hands-free device 3 starts searching for a radio signal transmitted from the portable telephone 1. When the radio signal has been found (step 302), the processor 33 performs a channel establishment procedure conforming to the predetermined protocol of the radio interface to establish a communication channel to the portable telephone 1 (step 303). After transmitting the ringing signal from the hands-free device 3 to the portable telephone 1, steps 304-309 of FIG. 5 are the same as the steps 102-107 of FIG. 3, respectively.

According to the first embodiment, when the user has only the hands-free device 3 therewith and whereabouts of the portable telephone 1 becomes unknown, the user operates the ringing key 36 of the hands-free device 3 and thereby the ringing signal is transmitted to the portable telephone 1. This causes the portable telephone 1 to notify the user, by audible ringing, vibration, and/or LED blinking, of its whereabouts. Accordingly, the user can easily find the portable telephone 1.

In addition, a combination of audible ringer, vibration ringer and LED ringer can be previously set by the user. Accordingly, an appropriate ringing mode can he selected as circumstances demand.

A second embodiment of the present invention will be described with reference to FIGS. 6-8. In the second embodiment, the user can use the hands-free device 4 to select a desired one of a plurality of different ringers when calling the portable telephone 1. The different ringers may be audible ringer, vibration ringer, light-emitting ringer, and display ringer. In this case, two ringers (audible ringer and vibration ringer) are preferably adopted and one of them is selected by the user.

Figure 6:
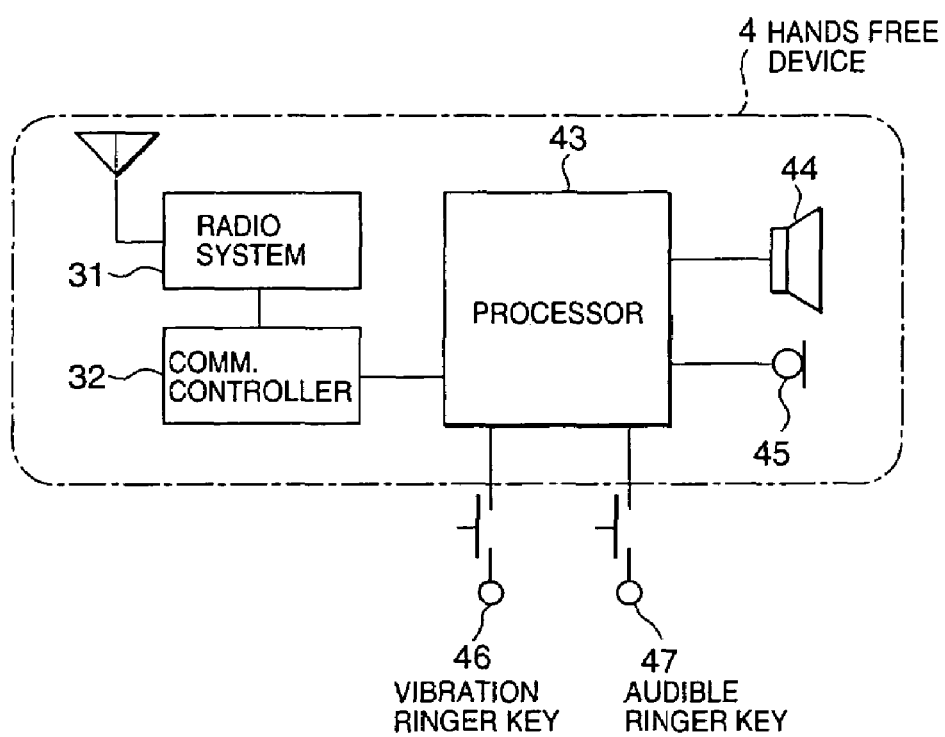
FIG. 6 is a block diagram showing a hands-free device of a radio communication system according to a second embodiment of the present invention.

Referring to FIG. 6, a hands-free device 4 according to the second embodiment is provided with a radio system 41, a communication controller 42, a processor 43, an earphone speaker 44, a microphone 45, a vibration ringer key 46, and an audible ringer key 47.

The radio system 41, the communication controller 42, the earphone speaker 44, and the microphone 45 are the same as the radio system 31, the communication controller 32, the earphone speaker 34, and the microphone 35 as shown in FIG. 2.

The processor 43 is connected to the vibration ringer key 46 and the audible ringer key 47. When depressing one of the vibration ringer key 46 and the audible ringer key 47, a corresponding ringing signal is transmitted to the portable telephone 1.

A calling operation when the audible ringer key 47 has been depressed will be described with reference to FIG. 7. Here, it is assumed that a communication channel has been established between the portable telephone 1 and the hands-free device 4.

Referring to FIG. 7, when a user depresses the audible ringer key 47 of the hands-free device 4 to call the portable telephone 1 (step 401), the processor 43 of the hands-free device 4 instructs the communication controller 42 to transmit an audible ringing signal to the portable telephone 1 at the control channel. The audible ringing signal is a control signal for instructing audible ringer of the portable telephone 1 to notify the user where the portable telephone 1 is located. In the hands-free device 4, the processor 43 selects input signals of the speaker 44 so as to output various tones generated therein to the speaker 44 (step 402).

When the audible ringing signal has been received from the hands-free device 4, the central controller 17 of the portable telephone 1 cuts off the signal path of the main communication controller 12 to prohibit incoming calls from the mobile communications network as describe before (step 403).

Subsequently, the central controller 17 instructs the device controller 13 to select input signals of the speaker 18 in response to the audible ringing signal received from the hands-free device 4 (step 404). Further, the central controller 17 instructs the device controller 13 to display a message indicating that this telephone is ringed on the LCD device 21 (step 405). Thereafter, the central controller 17 instructs the device controller 13 to start alerting by driving the speaker 18 (step 406).

When having started alerting, the central controller 17 instructs the external communication controller 15 through the external interface controller 16 to transmit a response signal to the hands-free device 4. When receiving the response signal from the portable telephone 1, the processor 43 starts a ring back tone to notify the user that the portable telephone 1 starts alerting (step 407).

A calling operation when the vibration (silent) ringer key 46 has been depressed will be described with reference to FIG. 8. Here, it is assumed that a communication channel has been established between the portable telephone 1 and the hands-free device 4.

Referring to FIG. 8, when a user depresses the vibration ringer key 46 of the hands-free device 4 to call the portable telephone 1 (step 501), the processor 43 of the hands-free device 4 instructs the communication controller 42 to transmit a vibration ringing signal to the portable telephone 1 at the control channel. The vibration ringing signal is a control signal for instructing vibration ringer of the portable telephone 1 to notify the user where the portable telephone 1 is located. In the hands-free device 4, the processor 43 selects input signals of the speaker 44 so as to output various tones generated therein to the speaker 44 (step 502).

When the vibration ringing signal has been received from the hands-free device 4, the central controller 17 of the portable telephone 1 cuts off the signal path of the main communication controller 12 to prohibit incoming calls from the mobile communications network as describe before (step 503).

Subsequently, the central controller 17 instructs the device controller 13 to select input signals of the speaker 18 in response to the vibration ringing signal received from the hands-free device 4 (step 504). Further, the central controller 17 instructs the device controller 13 to display a message indicating that this telephone is ringed on the LCD device 21 (step 505). Thereafter, the central controller 17 instructs the device controller 13 to start alerting by driving the vibrator 20 (step 506).

When having started alerting, the central controller 17 instructs the external communication controller 15 through the external interface controller 16 to transmit a response signal to the hands-free device 4. When receiving the response signal from the portable telephone 1, the processor 43 starts a ring back tone to notify the user that the portable telephone 1 starts alerting (step 507).

The hands-free device 4 may be provided with an LED ringer key in place of the vibration ringer key 46. In this case, an LED blinking mode may be used instead of the vibration mode.

According to the second embodiment, the user can select a desired one of audible ringer and silent ringer (vibration and/or LED blinking) when looking for the portable telephone 1. Therefore, an appropriate one of audible ringer and silent ringer may be selected as circumstances demand. For example, under low light conditions, the LED blinking ringer is effective.

The invention claimed is:

1. A communication method between a portable device and its accessory using a radio channel, comprising the steps of:
depressing a predetermined key of the accessory to transmit a ringing signal to the portable device;
when receiving the ringing signal from the accessory, the portable device starts alerting;
transmitting a response signal to the accessory to notify the accessory that the portable device is alerting; and
depressing a predetermined key of the portable device so that the portable device stops alerting.

2. The communication method according to claim 1, wherein the portable device is previously set to one of audible ringing mode and silent ringing mode, wherein the portable device starts alerting according to a preset ringing mode.

3. The communication method according to claim 1, wherein the ringing signal designates one of audible ringing mode and silent ringing mode, wherein the portable device starts alerting according to a designated ringing mode.

4. The communication method according to claim 1, wherein the portable device is previously set to at least one ringing mode of audible ringing mode, vibration ringing mode, a light-emitting ringing mode, and a display ringing mode, wherein the portable device starts alerting according to said at least one ringing mode.

5. The communication method according to claim 1, wherein the ringing signal designates one of audible ringing mode, vibration ringing mode, a light-emitting ringing mode, wherein the portable device starts alerting according to a designated ringing mode.

6. The communication method according to claim 1, wherein the radio channel is established in response to the operation of the predetermined key of the accessory before the accessory transmits the ringing signal to the portable device.

7. The communication method according to claim 1, wherein the radio channel includes a control channel and a data channel, wherein the ringing signal is transmitted at the control channel.

8. The communication method according to claim 7, wherein the portable device is a portable telephone operable in a mobile communications network and the accessory is a hands-free device for the portable telephone, wherein, when the portable telephone actively connected to the hands-free device is operating on communication with the mobile communications network, a reception voice signal which the portable telephone receives from the mobile communications network is transmitted to the hands-free device and a transmission voice signal which the hands-free device inputs is transmitted to the portable telephone.

9. The communication method according to claim 1, further comprising the step of:
generating a ring notification tone to notify a user that the portable device started alerting upon receipt of said response signal at the accessory.

10. The communication method according to claim 1, wherein when receiving the ringing signal from the accessory, the portable device cuts off a signal path of a main communication controller to prohibit incoming calls.

11. The communication method according to claim 10, further comprising the steps of
transmitting an acknowledgement signal to the accessory device that said portable device has been located; and
restoring the signal path to allow incoming calls.

12. The communication method according to claim 11, wherein upon receipt of said acknowledgement signal, the accessory stops said ring notification tone.

13. A radio communication system comprising a portable device and its accessory, wherein
the portable device comprises:
a first communication controller for controlling communication with the accessory at a radio channel according to a predetermined protocol;
at least one alerting device for ringing in a certain mode;
a keypad for inputting a desired instruction; and
a first controller controlling the communication controller and the at least one alerting device such that the at least one alerting device starts alerting according to the certain mode when receiving a ringing signal from the accessory, and stops alerting when a predetermined key of the keypad is depressed, where the first controller transmits a response signal to the accessory to notify the accessory that the portable device is alerting, and
the accessory comprises:
a second communication controller for controlling communication with the accessory at a radio channel according to the predetermined protocol;
an input device for inputting a ringing instruction; and
a second controller controlling the second communication controller such that a ringing signal is transmitted to the portable device when a predetermined key of the accessory is depressed.

14. The radio communication system according to claim 13, wherein the at least one alerting-device is at least one of audible ringer using a speaker, vibration ringer using a vibrator, a light-emitting ringer using a light-emitting diode, and a display ringer using a display device.

15. The radio communication system according to claim 14, wherein the certain mode is predetermined in the portable device, wherein the certain mode includes at least one ringing mode of audible ringing mode, vibration ringing mode, a light-emitting ringing mode, and a display ringing mode.

16. The radio communication system according to claim 14, wherein the certain mode is designated by the ringing signal received from the accessory, wherein the certain mode is one of audible ringing mode, vibration ringing mode, a light-emitting ringing mode.

17. The radio communication system according to claim 16, wherein the input device has a plurality of ringing keys each corresponding to different ringing modes that are the audible ringing mode, the vibration ringing mode, and the light-emitting ringing mode.

18. A portable device allowing radio communication with its accessory, comprising:
a communication controller for controlling communication with the accessory at a radio channel according to a predetermined protocol;
at least one alerting device for ringing in a certain mode;
a keypad for inputting a desired instruction; and
a controller controlling the communication controller and the at least one alerting device such that the at least one alerting device starts alerting according to the certain mode when receiving a predetermined ringing signal from the accessory, and stops alerting when a predetermined key of the keypad is depressed, where the controller transmits a response signal to the accessory to notify the accessory that the portable device is alerting.

19. An accessory for a portable device allowing radio communication with its accessory, wherein the portable device starts alerting when receiving a predetermined ringing signal from the accessory, comprising:
- a communication controller for controlling communication with the accessory at a radio channel according to the predetermined protocol;
- an input device for inputting a ringing instruction;
- a controller controlling the second communication such that the predetermined ringing signal is transmitted to the portable device when a predetermined key of the accessory is depressed; and
- a processor for receiving a response signal to notify the accessory that the portable device is alerting.

* * * * *